US009492810B2

United States Patent
Curran et al.

(10) Patent No.: US 9,492,810 B2
(45) Date of Patent: Nov. 15, 2016

(54) PHOTOCATALYST

(71) Applicant: Keronite International Limited, Haverhill (GB)

(72) Inventors: James Curran, Haverhill (GB); Kangala Chipasa, Melton Mowbray (GB); Antony Leigh, Pemberton (GB)

(73) Assignee: Keronite International Limited, Haverhill, Suffolk (GB)

( * ) Notice: Subject to any disclaimer, the term of this patent is extended or adjusted under 35 U.S.C. 154(b) by 0 days.

(21) Appl. No.: 14/389,284

(22) PCT Filed: May 30, 2013

(86) PCT No.: PCT/GB2013/051444
§ 371 (c)(1),
(2) Date: Sep. 29, 2014

(87) PCT Pub. No.: WO2013/144660
PCT Pub. Date: Oct. 3, 2013

(65) Prior Publication Data
US 2015/0068906 A1    Mar. 12, 2015

(30) Foreign Application Priority Data

Mar. 30, 2012  (GB) .................................. 1205742.8
Oct. 19, 2012   (GB) .................................. 1218832.2
Mar. 28, 2013  (GB) .................................. 1305722.9

(51) Int. Cl.
*B01J 37/00*    (2006.01)
*B01J 21/06*    (2006.01)
(Continued)

(52) U.S. Cl.
CPC ............. *B01J 21/063* (2013.01); *B01J 35/002* (2013.01); *B01J 35/004* (2013.01); *B01J 35/04* (2013.01);
(Continued)

(58) Field of Classification Search
CPC .... B01J 21/063; B01J 35/004; B01J 37/348; B01J 37/349; B01J 35/1004; B01J 35/1009; B01J 35/1014; B01J 35/1019; B01J 35/1023; B01J 37/0226; C25D 11/024; C25D 11/026; C25D 11/26
USPC ........................................................ 502/350
See application file for complete search history.

(56) References Cited

U.S. PATENT DOCUMENTS 6,248,235 B1    6/2001 Scott
6,344,127 B1*  2/2002 Itoh ........................ B01J 35/004
                                                            205/171
(Continued)

FOREIGN PATENT DOCUMENTS

CN     101380569 A    3/2009
EP        2409954 A1   1/2012
(Continued)

OTHER PUBLICATIONS

"Porous nanocrystalline titania films by plasma electrolytic oxidation," Y. Han et al. Surface and Coatings Technology 154 (2002), pp. 314-318.*
(Continued)

*Primary Examiner* — Patricia L Hailey
(74) *Attorney, Agent, or Firm* — Shumaker & Sieffert, P.A.

(57) ABSTRACT

The present invention relates to a photocatalyst and a method of manufacturing a photocatalyst. More specifically, the present invention relates to a high surface area $TiO_2$ photocatalyst formed by electrolytic discharge oxidation (EDO) of a substrate comprising titanium. A flexible high surface area photocatalyst architecture comprising a compliant, cohesive, well-adhered and highly porous surface layer of the anatase phase of titanium dioxide is provided. The highly porous surface layer of the anatase phase of titanium dioxide is formed in a single step by the electrolytic oxidation of a titanium surface on a permeable, flexible, and electrically conductive substrate sponge structure.

12 Claims, 17 Drawing Sheets

(51) Int. Cl.
*B01J 35/00* (2006.01)
*B01J 37/34* (2006.01)
*B01J 35/04* (2006.01)
*B01J 35/06* (2006.01)
*C02F 1/72* (2006.01)
*B01J 37/02* (2006.01)
*C25D 11/02* (2006.01)
*C25D 11/26* (2006.01)
*H01M 8/16* (2006.01)
*B01J 35/10* (2006.01)
*C02F 1/32* (2006.01)
*C02F 3/00* (2006.01)
*C02F 101/30* (2006.01)

(52) U.S. Cl.
CPC ............. *B01J 35/06* (2013.01); *B01J 37/0226* (2013.01); *B01J 37/348* (2013.01); *C02F 1/32* (2013.01); *C02F 1/725* (2013.01); *C25D 11/024* (2013.01); *C25D 11/026* (2013.01); *C25D 11/26* (2013.01); *H01M 8/16* (2013.01); *B01J 35/1066* (2013.01); *B01J 35/1071* (2013.01); *B01J 35/1076* (2013.01); *C02F 1/325* (2013.01); *C02F 3/005* (2013.01); *C02F 2101/30* (2013.01); *C02F 2305/10* (2013.01); *Y02E 60/527* (2013.01)

(56) References Cited

U.S. PATENT DOCUMENTS 8,975,205 B2 * 3/2015 Smith .................... B01J 23/30
502/305

2009/0223829 A1 * 9/2009 Gao .................... C23C 18/1848
205/200
2010/0047611 A1 2/2010 Cho
2011/0160047 A1 6/2011 Masahasshi et al.
2015/0111725 A1 * 4/2015 Van Buskirk .......... B01J 21/063
502/200

FOREIGN PATENT DOCUMENTS

| JP | 11100695 | | 4/1999 | |
|---|---|---|---|---|
| JP | 2004230301 A | | 8/2004 | |
| JP | 2008302328 | | 12/2008 | |
| WO | 2009023578 A1 | | 2/2009 | |
| WO | 2009/157266 | * | 12/2009 | .............. B01J 35/02 |

OTHER PUBLICATIONS

"Oxide ceramic coatings on aluminium alloys produced by a pulsed bipolar plasma electrolytic oxidation process," A. L. Yerokhin et al. Surface & Coatings Technology 199 (2005), pp. 150-157.*

"Ordered macroporous rutile titanium dioxide by emulsion templating," Vinothan N. Manoharan et al. Micro- and Nano-photonic Materials and Devices, Proceedings of SPIE vol. 3937 (2000), pp. 44-50.*

International Search Report and Written Opinion for corresponding PCT Application No. PCT/GB2013/051444, dated Oct. 30, 2013 (12 pgs.).

Search Report from counterpart United Kingdom Application No. GB1305722.9, dated Sep. 2, 2013, 2 pp.

Marsolek, et al., "Intimate Coupling of Photocatalysis and Biodegradation in a Photocatalytic Circulating-Bed Biofilm Reactor," Biotechnology and Bioengineering, published online Mar. 19, 2008, 10 pp.

* cited by examiner

| Item No. | Item Name | Quanity | | | |
|---|---|---|---|---|---|
| 1 | Cylinder | 1 | 10 | Filter clamp | 1 |
| 2 | Glass/UV transparent | 1 | 11 | Spacer | 1 |
| 3 | LED module | 1 | 12 | Cathode material | 1 |
| 4 | Anode material | 1 | 14 | Ti sponge assembly | 1 |
| 5 | Top hat filter | 1 | 15 | Over ring | 1 |
| 6 | Treaded bar | 3 | 16 | Sensor | 2 |
| 7 | Flow ring | 1 | 17 | Gland | 2 |
| 8 | Reservoir | 1 | | | |
| 9 | Top cap | 1 | | | |

| Item No. | Item Name | Quanity |
| --- | --- | --- |
| 1 | Cylinder | 1 |
| 2 | Reservoir | 1 |
| 3 | LED module | 1 |
| 4 | Outer ring | 2 |
| 5 | Anode material | 1 |
| 6 | Glass/UV transparent | 1 |
| 7 | Spacer | 1 |

PHOTOCATALYST

This application is a national stage entry under 35 U.S.C. §371 of PCT Application No. PCT/GB2013/051444, filed May 30, 2013, which claims the benefit of Great Britain Application No. 1205742.8, filed Mar. 30, 2012, Great Britain Application No. 1218832.2, filed Oct. 19, 2012 and Great Britain Application No. 1305722.9, filed Mar. 28, 2013. The entire contents of each of PCT Application No. PCT/GB2013/051444, Great Britain Application No. 1205742.8, Great Britain Application No. 1218832.2 and Great Britain Application No. 1305722.9 are incorporated herein by reference.

The present invention relates to a photocatalyst and a method of manufacturing a photocatalyst. More particularly, but not exclusively, embodiments of the present invention relates to a high surface area $TiO_2$ photocatalyst formed by electrolytic discharge oxidation (EDO) of a substrate comprising titanium. The process can achieve a coating having over 96% of the anatase phase, and thereby providing surface area enhancements.

Embodiments of the invention may be used in a microbial fuel cell for treating water, and in particular to a fuel cell in which both photocatalytic treatment (known as "Advanced Oxidation") and microbial treatment can be employed. This could form an assembly for photocatalytic treatment of water which can be incorporated into a microbial fuel cell. The water which is treated could be for example be industrial wastewater, or could be ultra pure water in the electronics industry, from which micro contaminants can be removed.

Advanced Oxidation (AO) can be defined as a chemical reaction influenced or initiated by light that removes electrons from a catalyst (such as titanium dioxide, $TiO_2$) and adds those electrons to an organic substrate. During photocatalysis, the electronically excited catalyst, $TiO_2$ forms electron (−) and hole (+) pairs and has been shown to oxidize and reduce many organic molecules. As illustrated in FIG. 4, an electron located in the conduction band is capable of reducing species A. When an electron is excited by absorbing a photon (UV light) there remains a positive charge (a hole) in the valence band capable of oxidizing species D. The oxidizing power of such a hole is very high in $TiO_2$, especially in the anatase phase which is generally more photocatalytically active than rutile or amorphous $TiO_2$ The photocatalytic degradation of an organic pollutant is initiated by the formation of valence band holes ($h_{vB}^+$) and conduction band electrons ($e_{cB}^-$) which are formed in $TiO_2$ particles upon band gap illumination. These charge carriers migrate to the surface of the semiconductor ($TiO_2$) and react by electron transfer with donors and acceptors adsorbed at this surface. Commonly, it is believed that aromatic compounds are degraded by hydroxyl radicals, formed by oxidation of adsorbed water molecules or surface bound hydroxyl groups.

Industrial waste water contains many non-biodegradable organics, which make the application of microbial fuel cells for treatment of industrial wastewater very limited. Waste water treatment using $TiO_2$ as a photocatalyst has attracted a great deal of attention because of its high activity, chemical stability, robustness against photocorrosion, low toxicity, low pollution load, and availability at low cost[i]. However, the shortcomings of conventional powder catalysts include low efficiency of light use, difficulty of stirring during reaction and separation after reaction (usually using ultra-filtration), and low-concentration contamination near $TiO_2$ due to its low surface area[ii].

The current methods used to perform $TiO_2$ photocatalysis also include the application of UV onto a $TiO_2$ surface coating in the presence of the target waste stream. There are three possible serious drawbacks of UV/$TiO_2$ photocatalysis technology that has resulted in the failure of the technology to become established as a successful industrial waste water treatment technology. Firstly, the ability of the UV to effectively penetrate waste stream which could be turbid, secondly the limited effect of the $TiO_2$ catalyst due to the relatively small surface reaction area used in current systems, and thirdly UV has harmful effects on microbes. These drawbacks of $TiO_2$ result in low efficiency of photocatalytic activity in practical applications.

Recent research has demonstrated the principle of intimate coupling of photo-catalytic oxidation with biological treatment[iii], which utilises a macro-porous carrier material to provide sanctuary to the micro-organisms from the toxic reactants and UV light. The research demonstrated significant synergistic benefits including:

(1) Enhanced COD reduction: whereby photocatalytic oxidation converts poorly degradable organic species to less complex and easily digestible molecules that are rapidly metabolised by the microorganisms; and (2) Targeted oxidation of micropollutants: the rapid removal of easily digestible components ensures that photocatalytic oxidation is efficiently and selectively focused towards non-degradable components and that the formation of toxic 'over oxidised' by-products is prevent.

Microbial fuel cells (MFCs) are becoming an attractive method for treatment of wastewater because they enable energy recovery and reduction of production of excess sludge. However, the use of proton exchange membranes (PEMs) and mediators limit the application of MFCs for treatment of wastewater. Transfer of protons through PEMs is difficult since PEMs get fouled due to suspended solids and soluble contaminants found in wastewater. Moreover, PEMs are expensive.

Although MFCs were first demonstrated in 1910[iv], few practical advances were achieved for wastewater treatment MFCs until the early 1980s when it was discovered that current density and the power output could be greatly enhanced by the addition of electron mediators. Since then significant progress has been made[v]. Exoelectrogenic microorganisms degrade (oxidise) organic matter to produce electrons, protons and $CO_2$. The electrons travel through a series of respiratory enzymes in the cell (forming energy in the form of ATP) where they combine at the cathode with a terminal electron acceptor (e.g. oxygen, nitrate, sulphate, etc), which accepts the electrons and becomes redundant. The force that drives this reaction is determined by the potential difference between the oxidant and the reductant (typically 1.1V for the oxidation of organic matter with oxygen as the electron acceptor).

MFC utilise a special type of bacteria (termed exoelectrogens) that are able to transfer electrons to an electron acceptor exogenously (outside the cell), thereby enabling the energy to be recovered as electrical energy utilising fuel cell technology (see FIG. 1). The diversity of exoelectrogenic microbes is only just being discovered, demonstrating high performance at ambient (15-35° C.), high (50-60° C.—thermophiles) and low (<15° C.—psychrophiles) temperatures, and the ability to metabolise almost any organic matter (organic acids, carbohydrates, proteins, alcohols, cellulose, etc).

It was previously thought that exoelectrogenic microbes where only able to transfer electrons to the anode via mediators (self produced or chemically added electron shuttles). Chemical mediators where thus routinely added to the anode to achieve reasonable power generation, thereby significantly limiting applicability for wastewater treatment. A key breakthrough was realised in 1999 with the discovery of self produced microbial nano-wires, enabling direct cell electron transfer to the anode surface and thus mediatorless MFC operation.

The typical structure of MFC is similar to the proton exchange membrane fuel cell (PEMFC) which usually consists of an anode and a cathode compartment separated by a proton exchange membrane (PEM). The anode and cathode compartment were full of anolyte and catholyte, respectively. In the anode compartment, microorganisms oxidize the organic matters in wastewater to produce electrons and protons. The protons migrate from the anode compartment to the cathode compartment through the PEM, while the electrons pass through the external circuit to the cathode compartment. In the cathode compartment, electron acceptors combine with protons and electrons[vi].

Although the performance of MFCs has improved significantly in recently years, it is still much lower than that of chemical fuel cells. It was found that the cathodic losses, especially the cathodic activation losses, were one of the most important factors influencing the MFC performance. At research level significant progress[vii] has been made in advancing the fundamental science for MFCs, achieving power densities approaching those suitable for practical application (>1 kW/m$^3$). However, such laboratory MFCs have a number of important limitations that prevent commercial application:

(1) existing MFC designs utilise expensive platinum catalysts and proton/cationic exchange membranes that are not commercially viable for industrial scale wastewater treatment processes;
(2) exoelectrogen microbes have a broad but limited metabolic range and thus some organic species are not degraded during treatment. Existing MFCs typically achieve <80% COD reduction, and thus demonstrate inferior treatment performance (COD reduction) to aerobic processes, thereby negating the benefits achieved for energy production; and do not enable water re-use for on-site non-potable applications; and do not fully utilise the inherent energy content of the wastewater (low coulombic efficiency); and
(3) MFC treatment systems are still to be demonstrated at pilot scale, limited mainly by the lack of scalable and commercial viable MFC designs.

Oxygen is the most widely used cathodic electron acceptor in MFCs due to its unlimited availability in the environment and high redox potential. However, the unfavourable reaction kinetics of oxygen reduction on the surface of carbon electrodes and the low mass transfer coefficient of gaseous oxygen in catholyte severely hampers its application in MFCs[viii]. To overcome these disadvantages, many soluble electron acceptors with high reduction rate on carbon electrodes have been adopted in MFCs, such as hydrogen peroxide, ferricyanide, permanganate and potassium persulfate. However, the MFC performance was still low due to the low reduction kinetics of these electron acceptors on the carbon electrodes, including their slow regeneration rate.

In summary, whilst offering many advantages, MFCs have a number of limitations that have prevented their widespread application:

(1) high capital cost—existing MFC designs utilise expensive platinum catalysts and proton exchange membranes that are not commercially viable for industrial scale wastewater treatment processes;
(2) limited system efficiency—existing MFC designs achieve limited COD reduction, power generation and energy recovery; and
(3) system scale-up and demonstration—although the feasibility of MFCs has been demonstrated within the laboratory, commercially viable system scale-up to pilot scale for the treatment of a real industrial wastewater is still to be achieved and demonstrated.

EP 0 827 229 (Korea Institute of Science and Technology) discloses a biofuel cell which can react with an electrode without a mediator. Graphite rods are used as electrodes, and the anode and cathode compartments are separated by a sintered glass. Alternatively, the electrodes may be formed from graphite felt and separated by a cation-exchange membrane.

US 2005/0208343 (Kim et al.) discloses a mediator-less microbial fuel cell comprising a cathode compartment and an anode compartment which are separated with glass wool or glass beads, means for feeding air to the cathode compartment and means for feeding wastewater to the anode compartment. Graphite felt (which may be coated with a metal such as platinum) is used as an electrode of the cathode compartment.

WO 2009/149309 (Crookes) discloses a microbial fuel cell having separate anode and cathode modules in which cation flow between the modules is enabled by a source stream rather than via a membrane.

Other prior art includes CN 102329006 (University of Xian); JP 2006085911 (Matsuhita); CN 101483251 (University of Shantou); Environmental Science & Technology, Vol. 44, 2010, pages 5575-5580; Energy Fuels, Vol. 24, 2010, Anhuai Lu et al., pages 1184-1190; and Electrochemistry Communications, Vol. 11, 2009, Yan Li et al., pages 1496-1499.

BRIEF SUMMARY

In a first aspect of the present invention, there is provided a flexible high surface area photocatalyst architecture comprising a compliant, cohesive, well-adhered and highly porous surface layer of the anatase phase of titanium dioxide, formed in a single step by the electrolytic oxidation of a titanium surface on a permeable, flexible, and electrically conductive substrate sponge structure.

In a second aspect of the present invention, there is provided a photocatalyst comprising an electrically conductive titanium substrate having a macroporous architecture, wherein exposed surfaces of the titanium substrate have been converted into titanium dioxide.

In a third aspect of the present invention, there is provided a structure comprising an electrically conductive titanium substrate having a macroporous architecture, wherein exposed surfaces of the titanium substrate have been converted into titanium dioxide.

In a fourth aspect of the present invention, there is provided a method of manufacturing a photocatalyst comprising an electrically conductive titanium substrate having a macroporous architecture, by converting exposed surfaces of the titanium substrate into titanium dioxide.

In a fifth aspect of the present invention, there is provided a method of manufacturing a structure comprising an electrically conductive titanium substrate having a macroporous architecture, by converting exposed surfaces of the titanium substrate into titanium dioxide.

The photocatalyst is a macroporous titanium dioxide structure. This may be formed by surface oxidation of any permeable structure that presents a titanium surface (such as a sponge woven from titanium metal wire). Thus, a high surface area of anatase can be achieved in a single, cohesive, flexible, and readily scaleable unit. Through careful design of the titanium sponge architecture (e.g. the titanium weave density and the overall sponge geometry), the photocatalyst's structure may be optimised to give maximum exposure of the $TiO_2$ photocatalyst within the UV radiation attenuation length, and may fulfill additional functions of fluid flow management, and of UV shielding (e.g. of the microbes).

The macroporous architecture (or structure) may be woven, knitted, or configured to form a sponge or mesh by other means.

The macroporous architecture (or structure) may be formed from a perforated titanium sheet material. Preferably, the titanium sheet material will comprise multiple perforations.

The photocatalyst structure may also be optimised to give maximum exposure of the $TiO_2$ photocatalyst within a desired electromagnetic radiation attenuation range, such as within the attenuation length of any form of electromagnetic radiation, thereby matching the photocatalyst structure to suit a particular wavelength of electromagnetic radiation.

The photocatalyst may comprise a compliant, cohesive, well-adhered and highly porous surface layer of the anatase phase of titanium dioxide, formed in a single step by the electrolytic oxidation of a titanium surface on a permeable, flexible, and electrically conductive substrate sponge structure.

The titanium dioxide may be formed by pulsed bi-polar electrolytic discharge oxidation of the titanium surface, exposing the growing oxide to an oxygen rich plasma at temperatures of over 3000 K for periods of 1 to 100 microseconds, so as to yield a rough and highly porous oxide layer with a specific surface area of over 5 $m^2$ per gram of oxide, and a low stiffness (E<50 GPa).

The surface area may be over 10 $m^2$ per gram of oxide, and preferably, the surface area may be over 20 $m^2$ per gram of oxide, corresponding to a surface area enhancement of over 100 times.

The titanium metal employed may preferably be of commercially pure grades (grades 1-4, e.g. commercially pure grade 2 titanium is 99.6% pure), so as to yield a high proportion of the anatase phase of $TiO_2$ (>90 Weight %) during pulsed bi-polar electrolytic discharge oxidation in a dilute alkaline electrolyte (comprising an alkaline metal phosphate at <10 g per litre). Alternatively, pulsed bi-polar electrolytic discharge oxidation may be carried out in a dilute non-alkaline electrolyte.

The photocatalyst may consist of reinforced metal wire, offering a flexible compliant architecture, which will conform to varied geometries. For instance, this allows the photocatalyst to be wrapped around elements such as UV radiation sources in a water purification system.

The titanium oxide may be in the form of a permeable sponge structure which is used for fluid flow management in a water purification system. The electrically conductive substrate sponge structure can be used to electrically integrate the photocatalyst into an electrolytic cell.

If titanium (or any other metal) wire is used as a substrate, this photocatalyst benefits from the toughness and elasticity of the metal, and is a far more flexible and manageable structure for water purification applications than a powder-based photocatalyst or a more conventional porous ceramic.

It may, for example, be wrapped around a tubular UV source. In addition, a conductive substrate for the photocatalyst provides a pathway for the extraction of electrons, which may be used to promote photocatalytic efficiency by reducing the likelihood of electron-hole recombination, and may thus be integrated into the anode structure. Indeed, the anode for an electrolytic cell (whether photocatalytic or microbial or a combination thereof) may consist either in part, or in its entirety, of such a porous Ti/$TiO_2$ sponge structure.

Surface oxidation of the porous titanium structure may be achieved by anodising or thermal oxidation. Prior art for such processes exists: JP9085099 describes anodising titanium and other metals as a means of creating a photocatalyst structure, but such a process results in amorphous $TiO_2$, rather than the crystalline anatase form used in the present invention, and does not significantly enhance the surface area of the Ti structure. JP2003129290 and JP11100695 both seek to incorporate crystalline oxides into an anodically formed oxide by including a suspension of oxides in the anodising bath. Neither of these yields a high phase proportion of crystalline material.

CN101856609 employs a thermal oxidation process, whilst JP2008302328 employs anodic oxidation, followed by a separate heat treatment to achieve an anatase structure. In neither instance is the crucial enhancement of surface area achieved.

The present invention may also be used as part of an assembly for photocatalytic treatment of water comprising a source of UV light and a photocatalyst, wherein the photocatalyst is a macroporous structure comprising titanium dioxide.

A microbial fuel cell ("WC") for treating water, may also comprise a chamber having a porous anode and a porous cathode (which are preferably not separated by a porous barrier) through which water can flow, a photocatalyst for initial treatment of the water, a source of UV light for the photocatalyst, microorganisms associated with the anode for carrying out secondary treatment of the water to produce electrons and protons, means for transporting the electrons from the anode to the cathode, means for transporting the protons from the anode to the cathode, and a catalyst for catalysing an electron acceptor reaction at the cathode.

The combination of the UV source and photocatalyst in the fuel cell may be provided by an assembly.

An MFC may enable AO to take place as well as microbial oxidation and which allows transfer protons from the anode to the cathode without the application of mediators or PEMs. Intimate coupling of photocatalytic advanced oxidation with microbial activity provides a route to overcoming the limitations of WC microbial metabolic activity (thereby enhancing energy recovery and COD reduction) and to achieving treatment (oxidation) of hazardous micropollutants. The photocatalyst of the present invention may be used in a technique to allow AO and microbial oxidation to occur within the MFC environment, and also to an improved photocatalyst structure for the advanced oxidation stage itself.

Because the TiO2 photocatalyst described herein has a very flexible architecture (compliant and reinforced by a titanium wire substrate, for instance), it may be incorporated into a wide range of UV exposure systems and geometries.

The porous cathode preferably comprises convection channels on which a cathodic catalyst (such as an activated nickel catalyst) is deposited.

The fuel cell may comprise an inlet for introducing water into the chamber, an outlet through which treated water can leave the chamber, and means (such as a pump) for feeding water through the inlet, through the anode, through the cathode and out of the outlet. It may additionally comprise an oxygen permeable, water impermeable, layer (such as a PTFE layer) between the cathode and the outside of the cell, whereby oxygen from outside the cell can permeate into the cathode but water cannot escape out of the cell.

The present invention may be used as part of a method of treating water using a microbial fuel cell as defined herein.

In use, water is fed through an AO engineered layer to enable the oxidation of non-degradable organics to biodegradable substrates. The preferred embodiment of the present invention the following three features: (i) interconnected micro-pores of porous titanium sponge which provide a low-resistance flow through the anode structure and a cohesive and well-adhered layer of highly porous oxide, including nano-particles of anatase ($TiO_2$) on the surface of the titanium sponge which provide huge surface area that enhances the photo-catalytic oxidation process to extreme efficiency, (ii) a UV transparent porous skeleton (titanium sponge), which is an effective means to introduce the UV energy to the high surface area of $TiO_2$ thin coatings where the photocatalytic process takes place, and (iii) a metallic substrate which provides mechanical reinforcement to the ceramic photocatalyst surface, allowing it to be flexible and adaptable to a wide range of geometries (for example, it may be wrapped around tubular UV sources, or laid in sheets around the circumference of a pipe), (iv) an electrically conductive substrate which allows the photocatalyst to be integrated into an electrolytic cell (for example, it may be electrically biased to promote photocatalytic efficiency, it may be used for electrical power generation within a Graetzel cell, or an electrical bias may be applied for electrophoretic in-situ cleaning of the photocatalyst surface). (v) in relation to an MFC, this is the first invention which has utilised the photo-catalytic oxidation to enhance the degradation of recalcitrant organics within the MFC environment.

The microorganisms may be in the form of a biofilm attached to or deposited on the anode. The micro-porous structure which is a part of the MFC anode protects microbial films from toxic agents, whilst microorganisms rapidly metabolise the available biodegradable substrates releasing protons and electrons. Intimate coupling of AO within the MFC environment provides a route to overcoming the limitations of MFC thereby enhancing energy recovery and removal of biodegradable as well as recalcitrant organics from wastewater.

Controlling the flow of the feed from the anode to the cathode through the catalyst-coated convection channels (the pores) in the cathode structure enables the transfer of protons to the cathode, thereby enabling oxygen reduction reaction and preventing the back flow of oxygen. The convective proton transfer technique enables MFC operation without the application of PEMs thereby overcoming the limitations associated with their use.

A membraneless, platinum-free, air cathode design in accordance with the present invention preferably utilises a low cost, high performance platinum free oxygen reduction catalyst, bound to a cathode structure exposed to air, incorporating inner and outer PTFE diffusion layers enabling efficient permeation of protons ($H^+$) and oxygen to the catalyst sites, limiting oxygen permeation into the reactor and preventing water loss from the reactor. The membraneless cathode design is achieved via convective proton transfer within the MFC environment. The MFC is designed to support continuous flow (convection gradient) from the anode to the cathode, thereby achieving rapid transfer of protons from the anode to the cathode and preventing back-permeation of oxygen into the anode chamber. Convective proton transfer techniques has enabled the operation of MFC without a membrane, thereby overcoming the identified limitations associated with internal resistance and pH imbalance and achieving enhanced potential voltage and power generation.

By integrating the principles of 'membraneless cell design via convective proton transfer', a scalable and modular microbial fuel cell design for treatment of industrial waste water is obtained with the following advantages:

Replacement of expensive proton exchange membranes (PEM) used in the current state-of-the-art microbial fuel cells Capital and operation costs are low since no aeration of the cathode chamber is required. Additionally, significant operational cost savings, realised through:
(1) Recovery of organic content in waste water as electrical energy and achieving system sustainability, i.e., self-powering
(2) Enhanced treatment efficiency enabling water re-use for on-site non-potable applications
(3) Significant cost reductions for treated waste water effluent discharge to sewer Flexible design and operation, thus customisation to specific end-user requirements and functionality, enabling treatment of industrial waste waters with low to high organic contamination levels A number of embodiments will now be described with reference to the accompanying drawings, in which:

FIG. 1. is a schematic diagram showing the transfer of electrons and two alternative methods of proton transfer (i.e. convective proton transfer or proton transfer through a proton exchange membrane);

Figure 5:
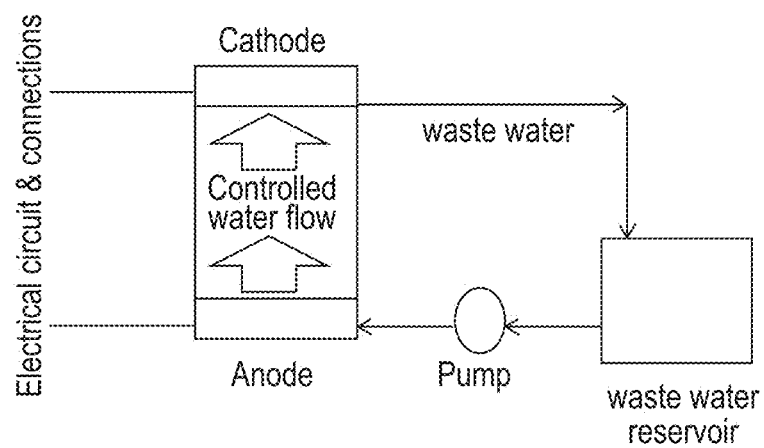
Figure 6:
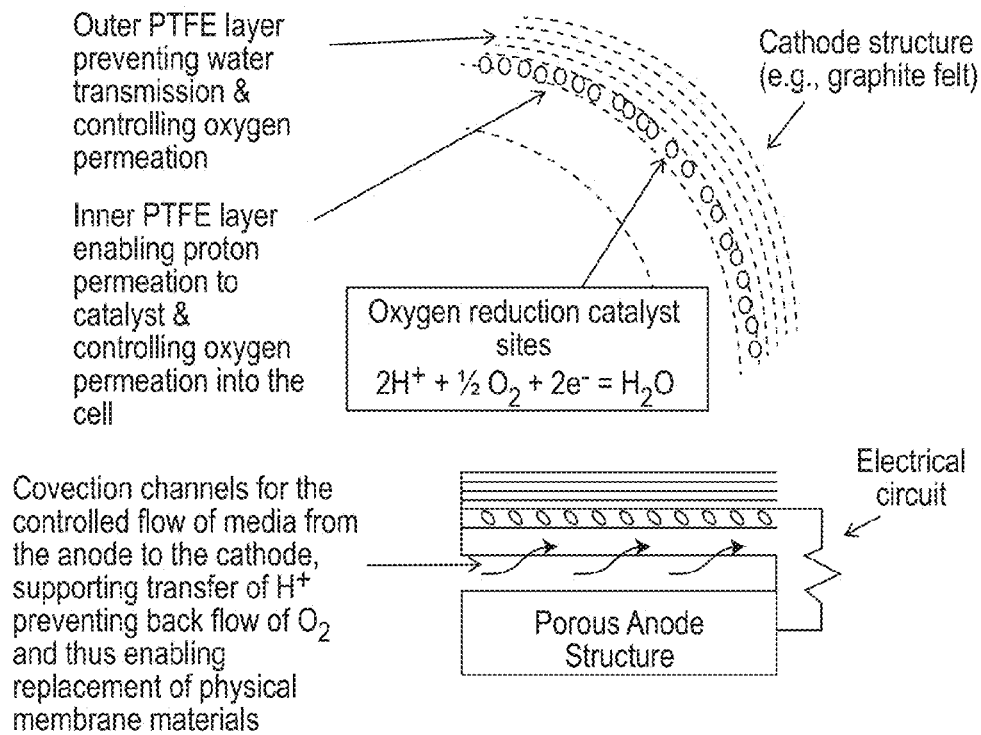
Figure 7:
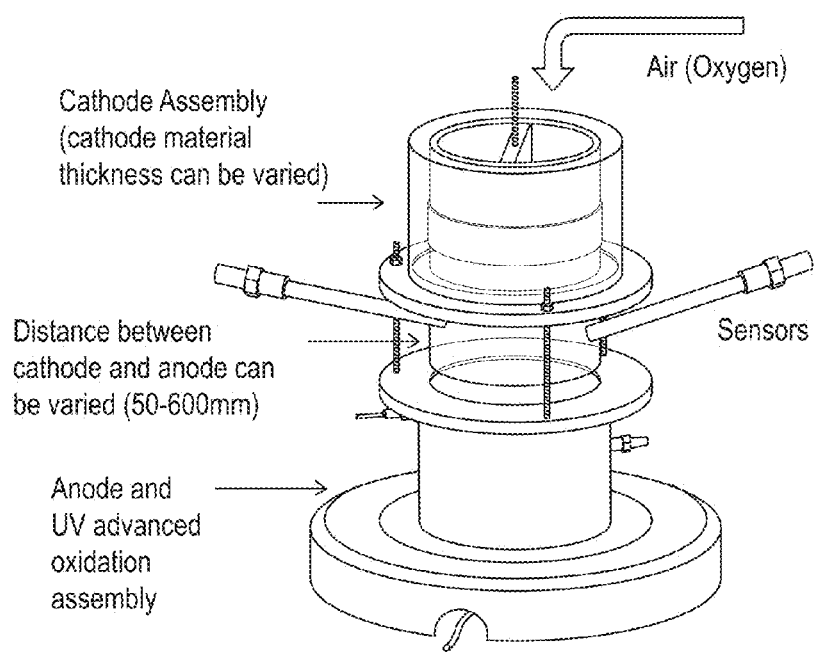
Figure 8:
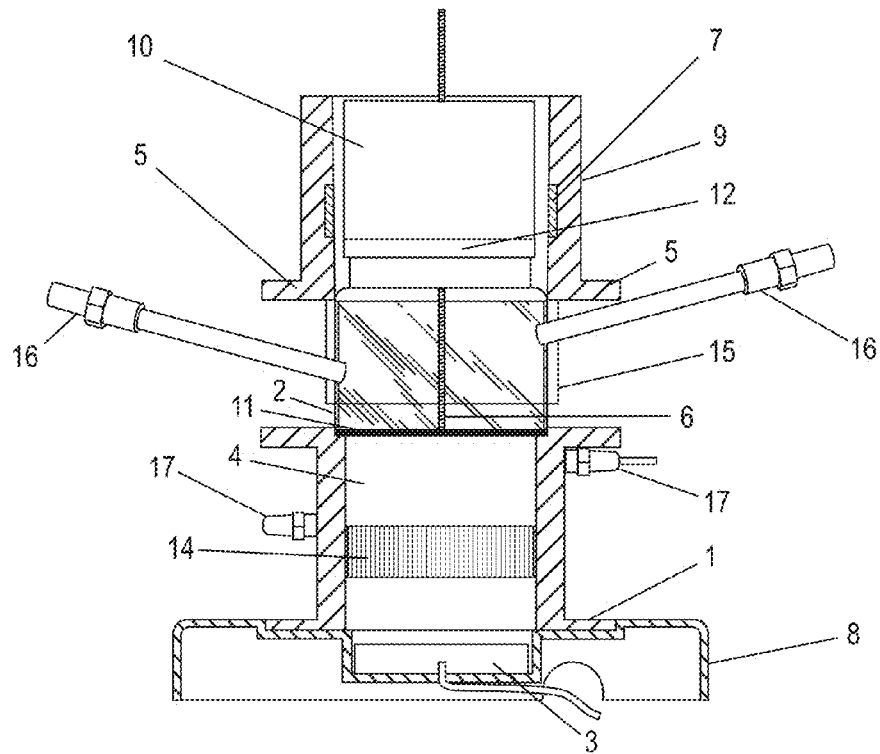
Figure 9:
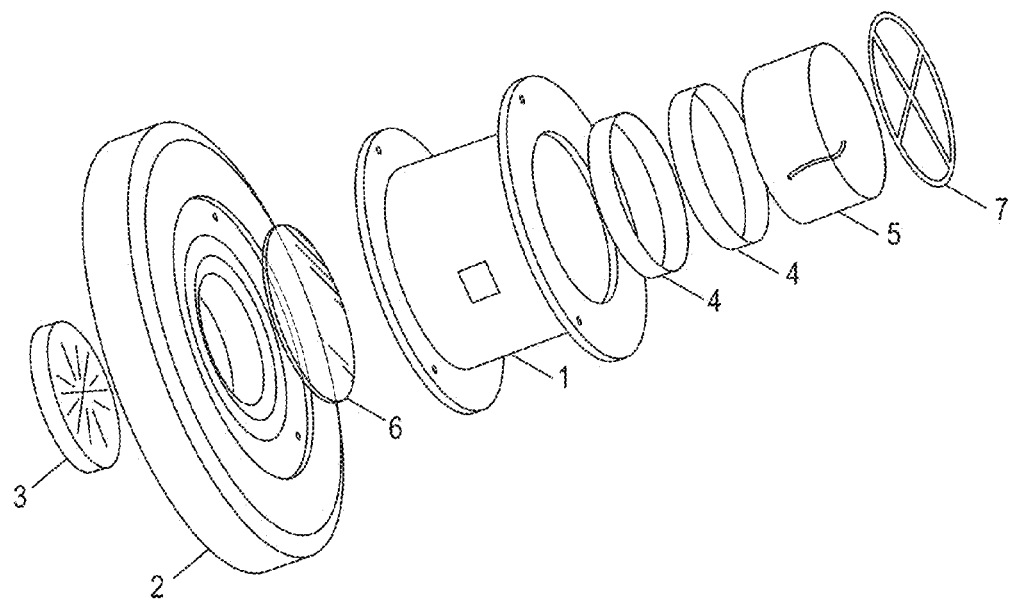
Figure 10:
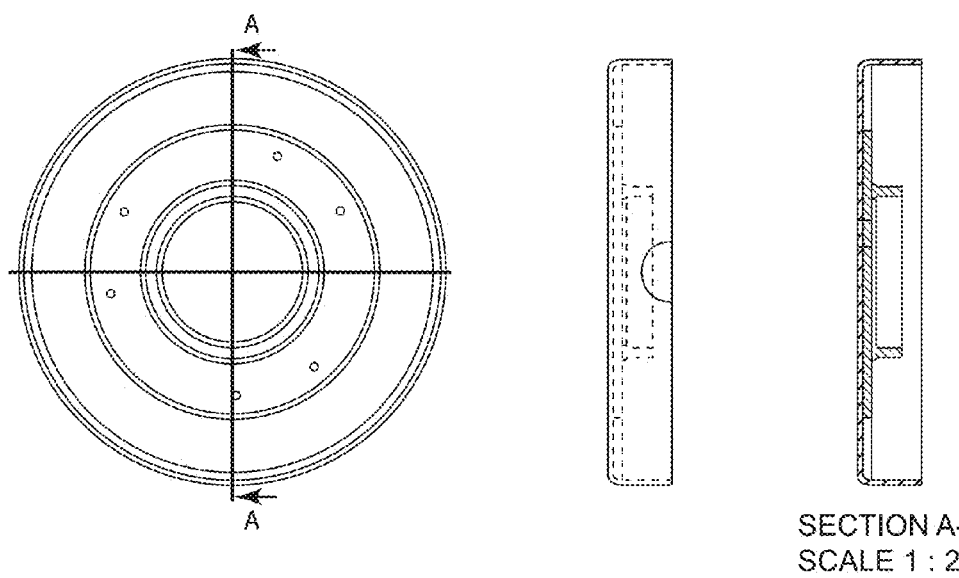
Figure 11:
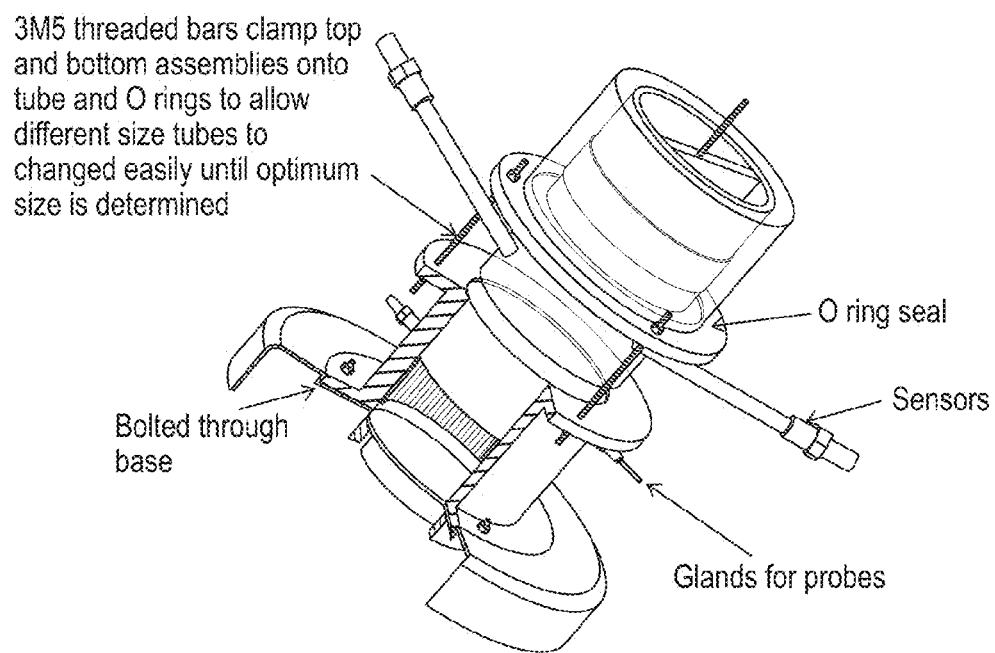
Figure 12:
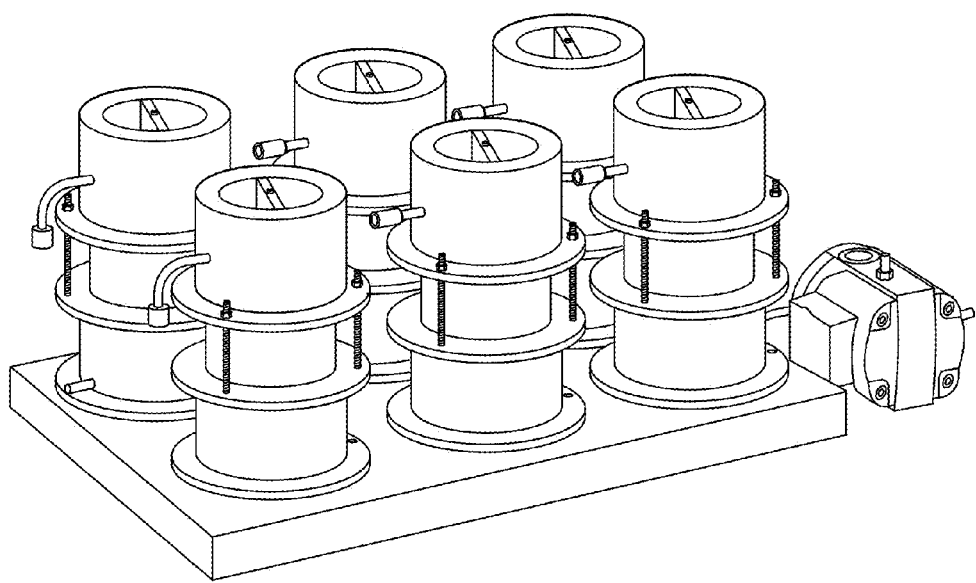
Figure 13:
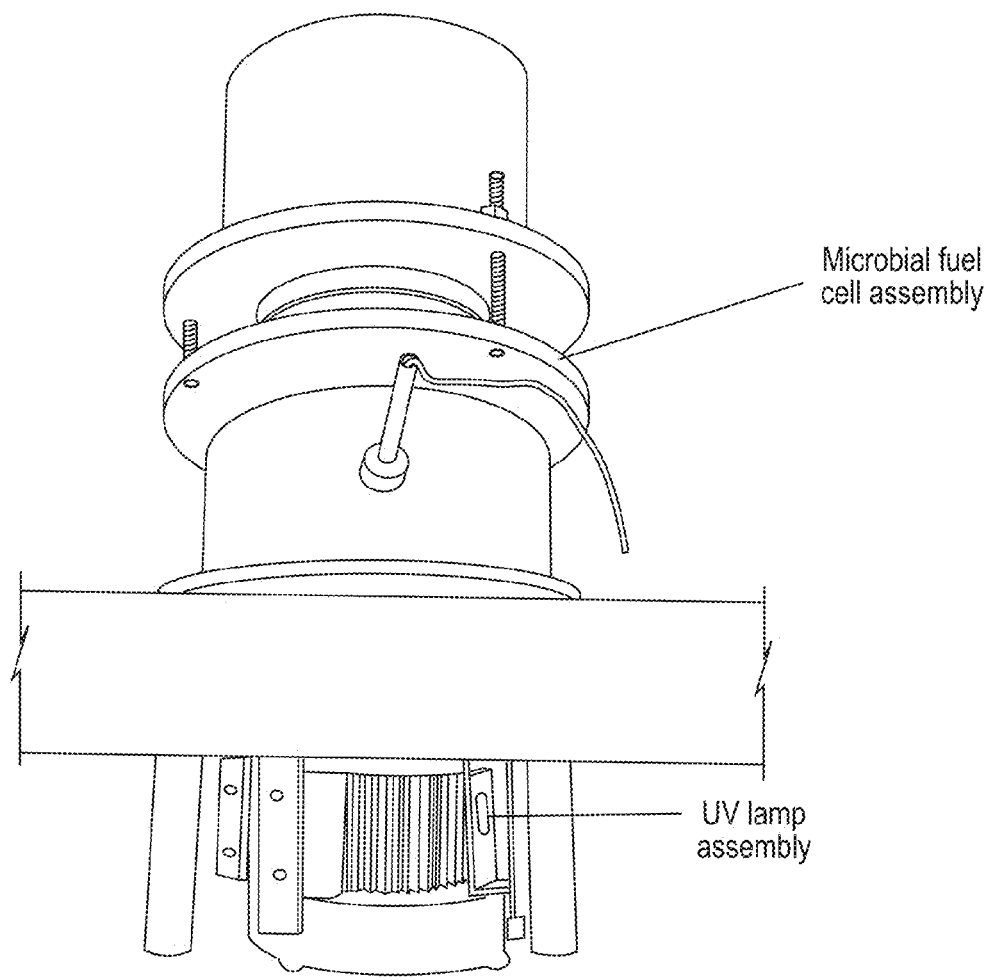
Figure 14:
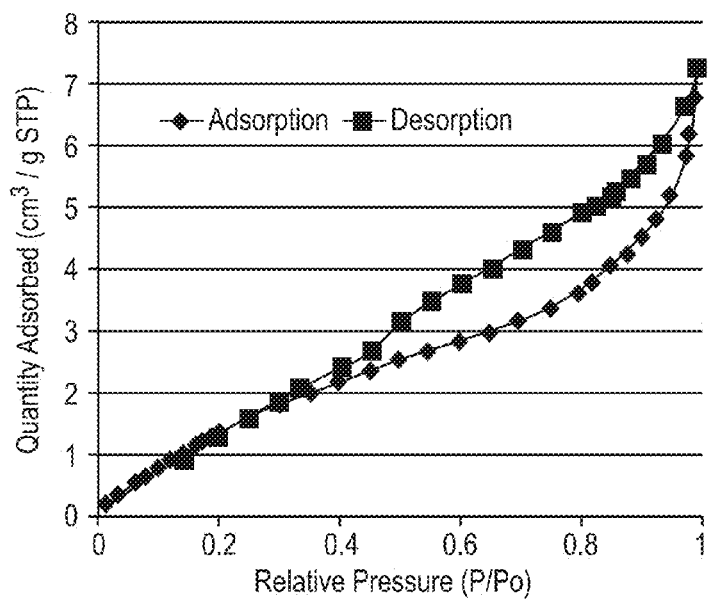
Figure 15:
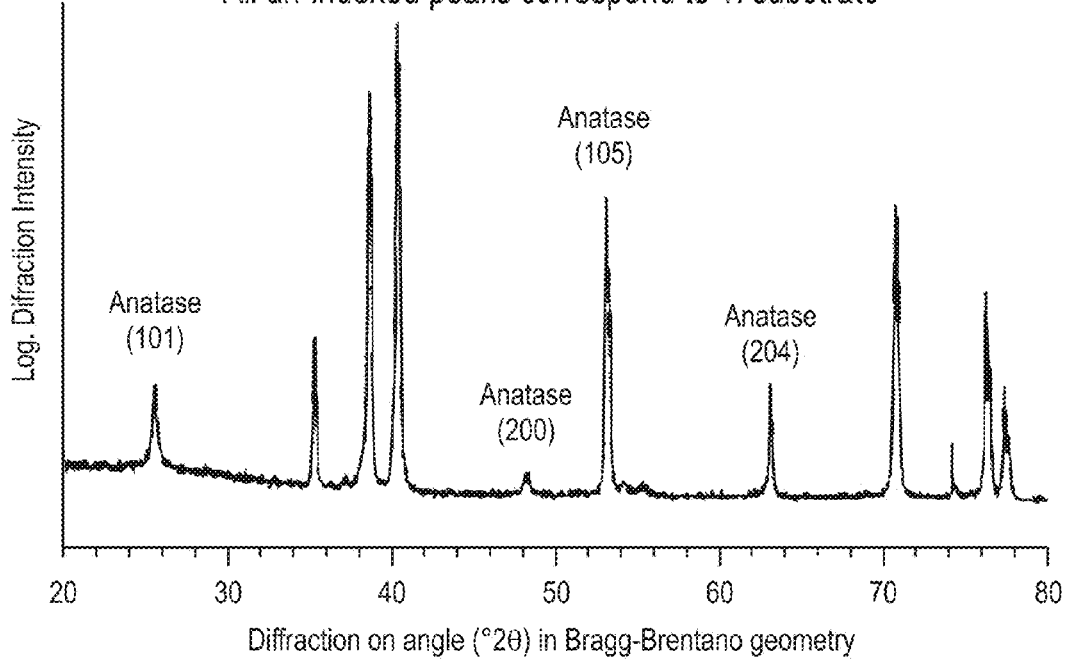
Figure 16:
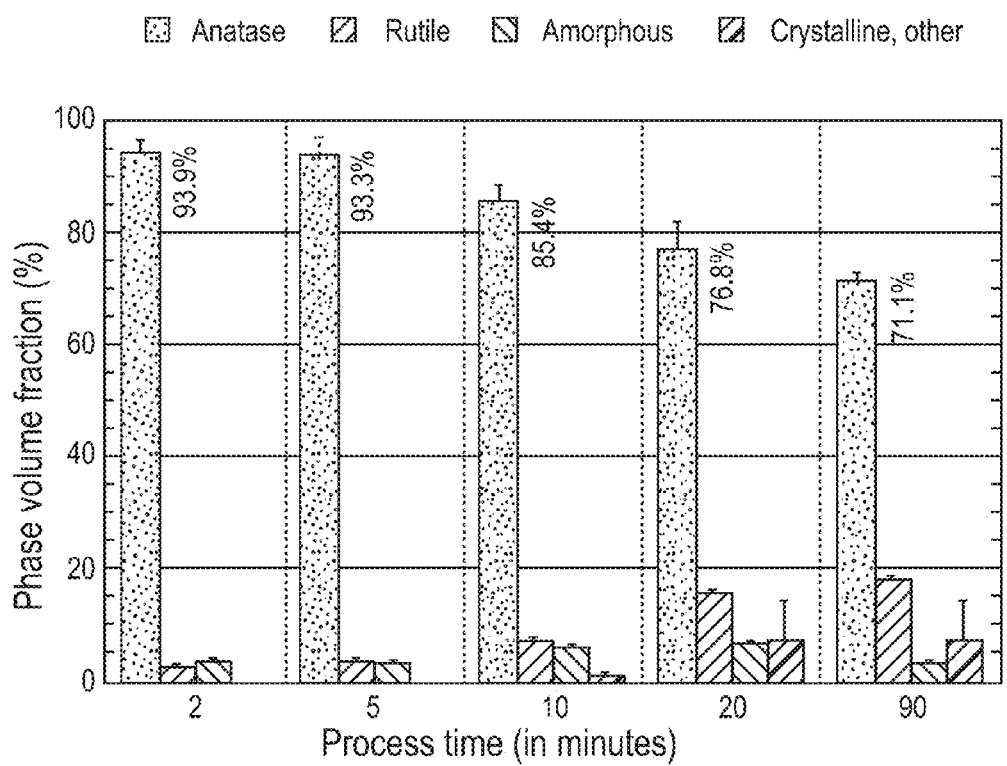
Figure 17:
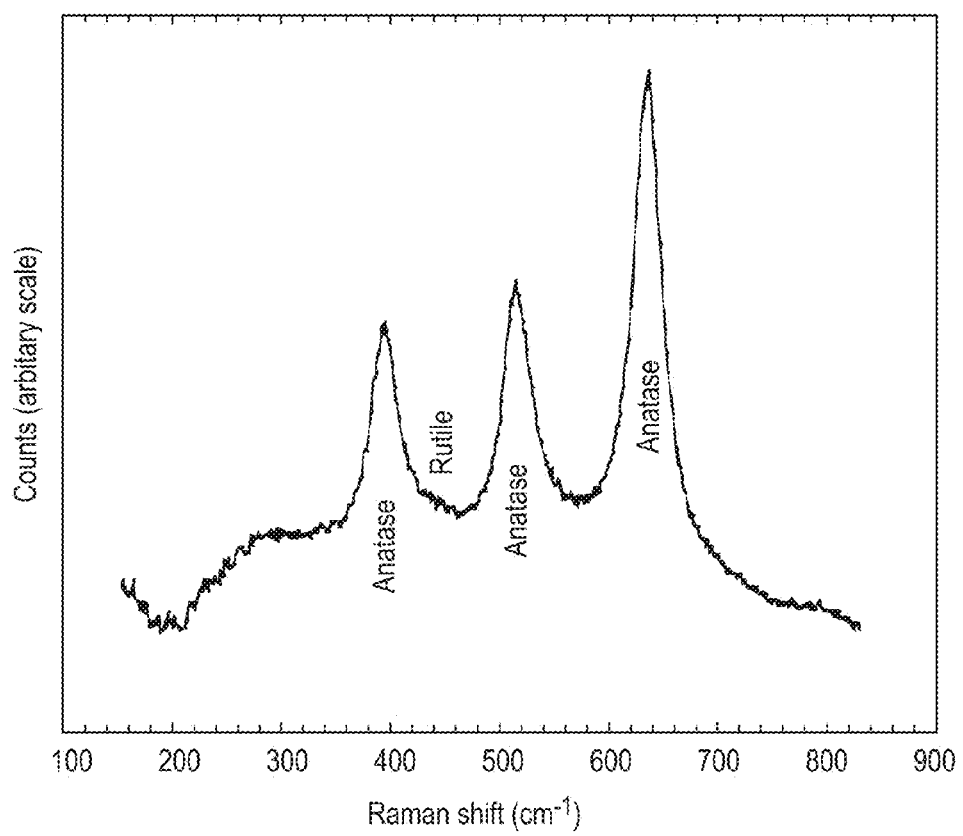
Figure 18:
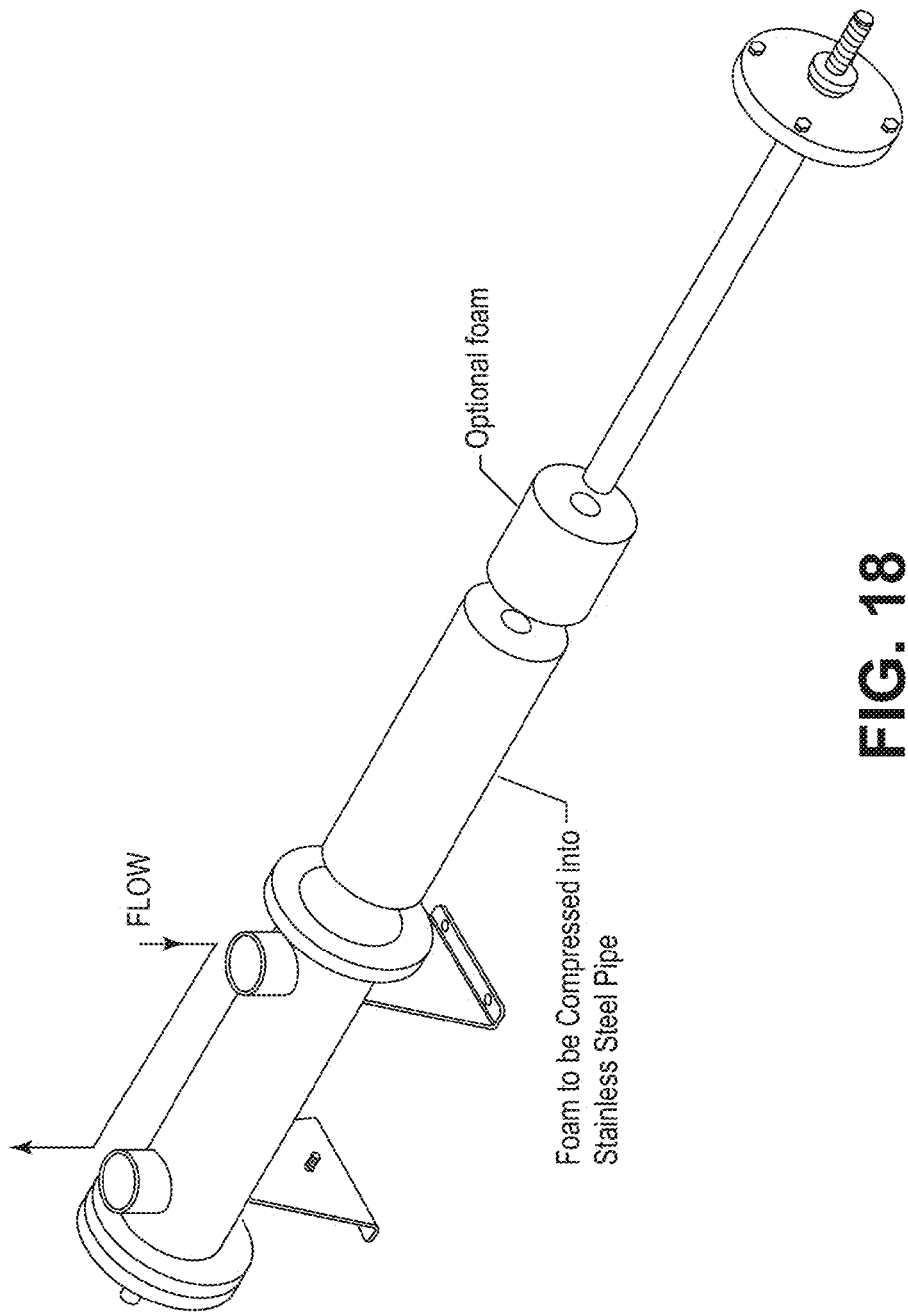

FIG. 5. is a schematic diagram showing the flow of waste water through a microbial fuel cell with controlled water flow between anode and cathode for convective proton transfer;

FIG. 6. is a schematic diagram showing the anode-cathode convection channels with a MFC membraneless cathode design;

FIG. 7. is a diagrammatic representation of an MFC (not to scale);

FIG. 8. shows an MFC (not drawn to scale) in cross-section;

FIG. 9. is an exploded view of the components of the bottom assembly of an MFC (not drawn to scale);

FIG. 10. is a schematic drawing showing the dimensions of the base (bottom assembly) of an MFC;

FIG. 11. is a schematic illustration of the assembly details of an MFC (not drawn to scale);

FIG. 12. is a schematic illustration of a scalable and modular array of MFCs (not drawn to scale);

FIG. 13. is a photograph (not to scale) of an MFC assembly;

FIG. 14 is a graph showing a nitrogen adsorption isotherm for a coated titanium dioxide catalyst of an embodiment of the present invention;

FIG. 15 is a graph showing an X-ray diffraction analysis of a coated titanium dioxide catalyst of an embodiment of the present invention;

FIG. 16 is a graph showing a Rietveld refinement of the X-ray data of FIG. 15;

FIG. 17 is a Raman spectroscopy analysis of a coated titanium dioxide catalyst of an embodiment of the present invention; and FIG. 18 shows a schematic diagram of an assembly incorporating a mesh (foam) of an embodiment of the present invention.

DESCRIPTION OF COMPONENTS

A full description of a number of preferred embodiments of the present invention can be found in the two Annexes which follow this document. A summary description of each of the most important components in the preferred embodiment is given below:

Anode: The anode is made of graphite felt (KFD21002500-KFD2 FELT) which is commercially available (Gee Graphite Limited, Dewsbury, UK). The thickness of the graphite felt is 2 mm and a total length of 2500 mm was used. The material was cut in 110 mm diameter discs that that were placed vertically in the microbial fuel cell as the anode. A copper wire pushed through the centre of the discs for the electrical connection. During the tests reported herein a total other carbon materials were also tested for this purpose (graphite felt, carbon cloth, knitted carbon cloth and carbon fibre).

Biofilm: Biofilms on the anode structure were developed by acclimatising a mixture of microorganisms found in activated sludge. Activated sludge was obtained from the local wastewater treatment plant (Wanlip Sewage Treatment plant, SevernTrent, UK). Initially, a solution of synthetic wastewater was used to develop the biofilms (sodium acetate, 1 g/L; $NH_4Cl$, 310 mg/L; KCl, 130 mg/L; $NaH_2PO_4$, 4.97 g/L; $Na_2HPO_4$, 2.75 g/L; vitamin solution, 12/5 ml/L; mineral water, 12.5 ml/L). In subsequent tests, in order to test the performance of the microbial fuel cell, the described synthetic wastewater as well as real industrial brewery wastewater (Carlsberg, UK) was used.

Cathode: The cathode is made of carbon cloth (Scott & Fyfe Ltd, Fife, UK) of 2 mm thickness. The material was cut in discs of 110 mm diameter an impregnated with a catalyst and treated with PTFE to form diffusion layers.

Photocatalyst: Photocatalyst of titanium dioxide was grown on titanium wire sponge (Knitmesh Ltd., Holywell, UK) by means of pulsed bi-polar electrolytic discharge oxidation (Keronite International Ltd, Cambridge, UK). The diameter of the titanium wire knitted to form a sponge was 0.3 mm. The overall thickness of the sponge ranged from 6 mm to 30 mm. The oxide layer was produced in thicknesses ranging from 2 μm to 15 μm in thickness. The resulting photocatalyst was highly flexible, and presented a surface area of over 5000 $cm^2$ (as verified by BET adsorption—FIG. 14), when an oxide layer of ~5 μm thickness was applied. It comprised >90 Wt % anatase, as characterised by X-Ray diffraction (FIG. 15, 16).

UV lamp assembly: Three types of UV sources were assembled and tested: 365 and 385 nm UV-LED lamps (respectively, NC4U133 and NC4U134, Nichia Corporation, Japan) as well as 254 nm UV-mercury lamp (IST, UK). For the UV-LED lamps a module consisting of 9 lamps was used. A UV transparent quartz glass was used to separate the UV lamp module and the titanium sponge.

Pump: As a means of controlling the flow rate and recirculation of the treated wastewater, a peristaltic pump was used (Watson Marlow, 520S).

Electrical connections: The anode was connected externally to the cathode by using a copper wire. Resistors and voltage measurement were achieved by using multimeter computer system (Pico System, Pico Technologies, Cambridge, UK).

The body of the cell: The main body (cylinder) is made of a non-metallic material, delrin (commercially available), which is a highly versatile engineering polymer with high mechanical strength and rigidity and good electrical insulating characteristics.

Figure 1:
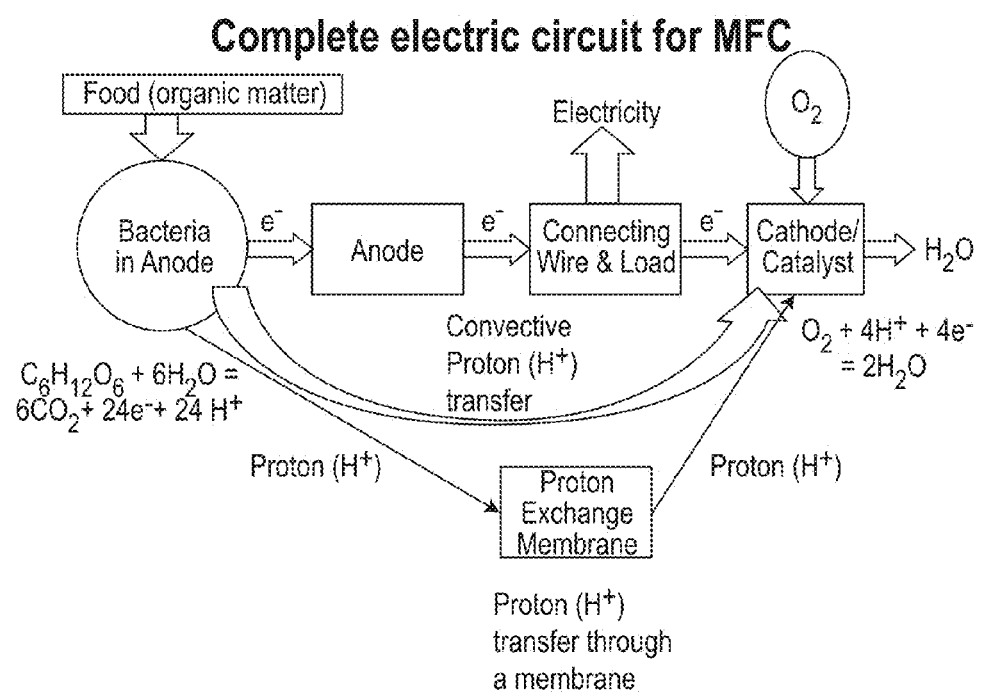
Figure 2:
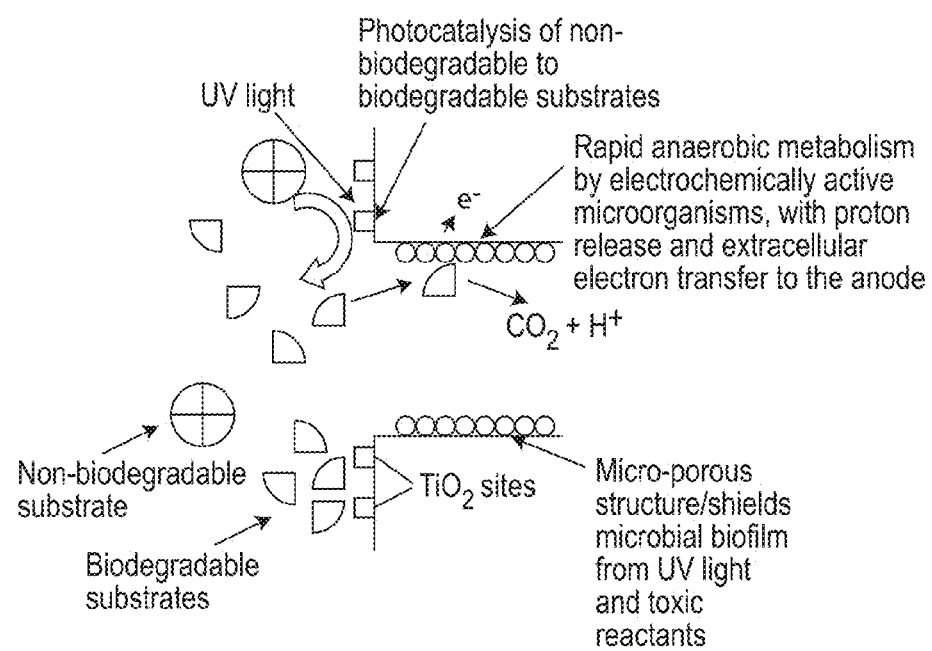
FIG. 2 is a schematic diagram showing intimate coupling of photocatalytic oxidation with microbial activity within a microbial fuel environment.
Figure 3:
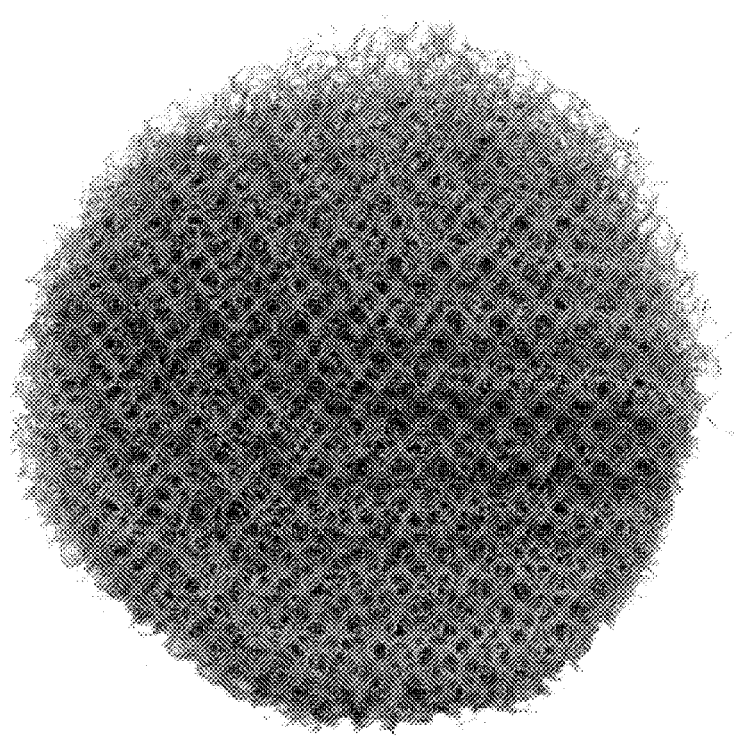
FIG. 3 shows a titanium sponge coated with titanium dioxide (not drawn to scale) which can be employed as a photocatalyst of an embodiment of the invention coupled to the anode structure within an MFC.
Figure 4:
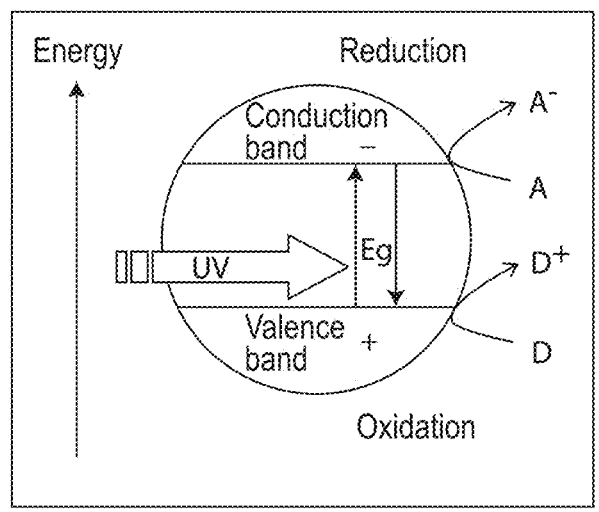
FIG. 4 is a diagram of an energy scheme for the photo-catalytic treatment using an embodiment of the present invention in which an electron is excited by light absorption.

In the operation of a mediator-less MFC several factors are limiting steps for electricity generation, such as fuel oxidation at the anode, electron transfer from microorganism to anode, external resistance of the circuit, proton transfer through the membrane to the cathode, and oxygen reduction at the cathode (FIG. 1). The acceptability of MFC for wastewater treatment would increase, if use of membrane can be eliminated using some alternative. The present invention is the development a membrane-less MFC via convective proton transfer, illustrated in FIG. 1. The MFC is designed to support continuous flow of protons (convection gradient) from the anode to the cathode, thereby achieving rapid transfer of protons from the anode to the cathode and preventing back permeation of oxygen into the anode chamber. Convective proton transfer techniques has enabled MFC operation without a membrane, thereby overcoming the identified limitations associated with internal resistance and pH imbalance and achieving enhanced potential voltage and power generation.

The anode-cathode convection channels ensures establishment of a controlled convection gradient between the anode and cathode compartments and thus efficient transfer of protons to the cathode and prevention of oxygen back-permeation to the anode. The membrane-less platinum free air-cathode design is constructed with a low cost, high performance platinum free oxygen reduction catalyst, bound to the cathode structure exposed to air, incorporating inner and outer PTFE diffusion layers enabling efficient permeation of protons and oxygen to the catalyst sites, limiting oxygen permeation into the cell and preventing water loss from the cell.

Modifications are expected especially as regards to the type and structure of the carbon based anode and cathode materials and the preferred optimum distance between the anode and the cathode, and their preparation including the coating of diffusion layers (PTFE) on the surface of the cathode material.

Assembly of UV Source and Photocatalyst

FIGS. 8 and 11 show a simple cylindrical element of a titanium dioxide photocatalyst 'sponge' (labelled as item 14 in FIG. 8), exposed from one side (the lower circular face) by an array of UV LEDs (with a UV transparent window and a space between the elements. A more demanding arrangement, which takes better advantage of the compliance and flexibility of the material to conform to a more common geometry of UV source (i.e. a tube) is shown in FIG. 18. This illustrates use of such a sponge in a stand-alone AdvOx™ unit (that is to say, one which is not intimately coupled to a microbial fuel cell). Long sheets of mesh may be spirally wound around the tube to form cylinders of photocatalyst material, through which a fluid may be pumped. This AdvOx™ unit geometry may be incorporated into the design of a microbial fuel cell.

A spiral wound section of photocatalyst sponge is created with an outside diameter and internal diameter to suit the dimensions of the UV chamber and the quartz sleeve(s) with an interference fit for better sponge density and location within the unit.

The chamber and sponge lengths are designed to ensure that the inflow to the unit is not interrupted to improve flow distribution. It is expected that this flow distribution is improved in future designs using CFD and other design tools.

The UV unit is designed so that the mesh can be easily fitted and removed for maintenance if required.

Surface Oxidation of Titanium Structure

In the present invention, a preferred means of achieving the surface oxidation of the porous titanium structure is pulsed electrolytic discharge oxidation, optionally pulsed bi-polar electrolytic discharge oxidation. Ideally, the process known as the Keronite® process is used, with hardware as described in WO9931309 and WO03083181, and with electrolytes comprising dilute aqueous solutions of phosphates (such as $Na_3PO_4$ in concentration ranges from 0.01-0.1M). This exposes a growing anodic oxide to an oxygen-rich plasma at temperatures of over 3000 K for periods of between 1 and 100 microseconds. This exposure generates microstructures with exceptionally high surface areas (over 5 $m^2$ per gram of coating—as evidenced by a representative nitrogen adsorption isotherm for 0.026 g of coating in FIG. 14), such that the surface area of a sponge woven from 0.3 mm diameter titanium metal wire may be increased by a factor of 5 or more with just a few microns of coating thickness. Furthermore, in the present development, it has been found that when applied to commercially pure grades of titanium (i.e. grades 1-4), the process also generates exceptionally high phase proportions (>90 Wt %) of the anatase phase of $TiO_2$ in this single process step. This is analysed by X-ray diffraction, by Rietveld refinement of the X-ray data and by Raman spectroscopy in FIGS. 15 to 17 respectively. The process also generates a cohesive, erosion-resistant, and well-adhered surface oxide with good compliance (with a Young's modulus of only ~15-20 GPa). All of these attributes combine to offer a practical high surface area anatase $TiO_2$ photocatalyst for advanced oxidation which is a practical structure for applications such as water purification and electrical power production within systems such as a Graetzel cell.

REFERENCES i. Jiaguo Yu, Xiujian Zhao. Effect of surface treatment on the photocatalytic activity and hydrophilic property of the sol-gel derived TiO2 thin films. Materials Research Bulletin 36 (2001) 97-107
ii. K.K. Bando et al. In-situ FT-IR study on $CO_2$ hydrogenation over Cu catalysts supported on $SiO_2$, $Al_2O_3$, and $TiO_2$. Applied Catalysis A: General 165 (1997) 391-409
iii. Marsolek MD et al. Intimate coupling of photocatalysis and biodegradation in a photocatalytic circulating-bed biofilm reactor. Biotechnol Bioeng 101: 83-92 (2008).
iv. Ieropoulos IA, Greenman J, Melhuish C, Hart J. Comparative study of three types of microbial fuel cell. Enzyme Microb Tech 37 (2005): 238-45.
v. Zhuwei Du a, Haoran Li a, Tingyue Gu. A state of the art review on microbial fuel cells: A promising technology for wastewater treatment and bioenergy. Biotechnology Advances 25 (2007): 464-482
vi. Fu Q, Li J, Liao Q, et al. Performance of an MFC using potassium persulfate as cathodic electron acceptor. J Eng Thermophys, 2009, 30(8): 1396-1398
vii. Zhuwei Du a, Haoran Li a, Tingyue Gu. A state of the art review on microbial fuel cells: A promising technology for wastewater treatment and bioenergy. Biotechnology Advances 25 (2007): 464-482.
viii. Rismani-Yazdi H, Carver S M, Chiristy A D, et al. Cathodic limitations in microbial fuel cells: An overview. J Power Sources, 2006, 180: 683-694
ix. Rhoads A, Beyenal H, Lewandowski Z. Microbial fuel cell using anaerobic respiration as an anodic reaction and biomineralized manganese as a cathodic reactant. Environ Sci Technol, 2005, 39: 4666-4671

CLAUSES

Some implementations of certain embodiments may be further understood with reference to the following clauses.

1a. A microbial fuel cell for treating wastewater, comprising
 a chamber having a porous anode and a porous cathode through which wastewater can flow,
 a photocatalyst for initial treatment of the wastewater,
 a source of UV light for the photocatalyst,
 microorganisms associated with the anode for carrying out secondary treatment of the wastewater to produce electrons and protons,
 means for transporting the electrons from the anode to the cathode,
 means for transporting the protons from the anode to the cathode,
 and a catalyst for catalysing an electron acceptor reaction at the cathode.
2a. A microbial fuel cell as described in clause 1a, wherein the photocatalyst is a macroporous structure comprising titanium dioxide.
3a. A microbial fuel cell as described in clause 2a, wherein the titanium dioxide is wholly or partly in the anatase phase and is formed by surface oxidation of a titanium-comprising surface.
4a. A microbial fuel cell as described in clause 2a or 3a, wherein the titanium dioxide is grown on the titanium-comprising surface by means of a plasma electrolytic oxidation process.
5a. A microbial fuel cell as described in any preceding clause, wherein the cathode catalyst is present in the pores of the cathode.
6a. A microbial fuel cell as described in any preceding clause, wherein the cathode catalyst is an activated nickel catalyst.
7a. A microbial fuel cell as described in any preceding clause, wherein the titanium-comprising surface is woven from titanium metal wire.
8a. A microbial fuel cell as described in any preceding clause, including an inlet for introducing wastewater into the chamber.
9a. A microbial fuel cell as described in any preceding clause, including an outlet through which treated wastewater can leave the chamber.
10a. A microbial fuel cell as described in clause 8a or 9a, including means for feeding wastewater through the inlet, through the anode, through the cathode and out of the outlet.
11a. A microbial fuel cell as described in any preceding clause, additionally comprising an oxygen permeable, water impermeable, layer between the cathode and the outside of the cell, whereby oxygen from outside the cell can permeate into the cathode but wastewater cannot escape out of the cell.

12a. A microbial fuel cell as described in clause 11a, wherein said layer comprises PTFE.

13a. A microbial fuel cell as described in any preceding clause, wherein the microorganisms are in the form of a biofilm attached to the anode.

14a. A method of treating wastewater using a microbial fuel cell as described in any preceding clause.

15a. A flexible high surface area photocatalyst architecture comprising a compliant, cohesive, well-adhered and highly porous surface layer of the anatase phase of titanium dioxide, formed in a single step by the electrolytic oxidation of a titanium surface on a permeable, flexible, and electrically conductive substrate sponge structure.

16a. A flexible high surface area photocatalyst, as described in clause 15a, where the titanium dioxide is formed by pulsed bi-polar electrolytic discharge oxidation of the titanium surface, exposing the growing oxide to an oxygen rich plasma at temperatures of over 3000 K for periods of 1 to 100 microseconds, so as to yield a rough and highly porous oxide layer with a specific surface area of over 5 m$^2$ per gram of oxide, a low stiffness (E <50 GPa).

17a. A flexible high surface area photocatalyst, as described in clauses 15a and 16a, where the titanium metal is of commercially pure grades (grades 1-4), so as to yield a high proportion of the anatase phase of TiO$_2$ (>90 Weight %) during pulsed bi-polar electrolytic discharge oxidation in a dilute alkaline electrolyte (comprising an alkaline metal phosphate at <10 g per litre).

18a. A flexible high surface area photocatalyst, as described in any of the preceding clauses, where the permeable sponge structure is used for fluid flow management in a water purification system.

19a. A flexible high surface area photocatalyst, as described in any of the preceding clauses, where the electrically conductive substrate sponge structure is used to electrically integrate the photocatalyst into an electrolytic cell.

20a. A microbial fuel cell, as described in any preceding clause, where the photocatalyst is integrated into the anode structure 1b. An assembly for photocatalytic treatment of water comprising a source of UV light and a photocatalyst, wherein the photocatalyst is a macroporous structure comprising titanium dioxide.

2b. An assembly as described in clause 1b, wherein the titanium dioxide is wholly or partly in the anatase phase and is formed by surface oxidation of a titanium-comprising surface.

3b. An assembly as described in clause 1b or 2b, wherein the titanium dioxide is grown on the titanium-comprising surface by means of a plasma electrolytic oxidation process.

4b. An assembly as described in clause 3b, wherein the titanium-comprising surface is woven from titanium metal wire.

5b. An assembly as described in any preceding clause, wherein the photocatalyst is in the form of a cylinder and wherein in use UV light shines on one face of the cylinder.

6b. An assembly as described in any of clauses 1b to 5b, wherein the source of UV light is in the form of an elongate element and wherein the photocatalyst is disposed around said elongate element.

7b. A microbial fuel cell for treating water, comprising
a chamber having a porous anode and a porous cathode through which water can flow,
an assembly as described in any preceding clause for initial treatment of the water,
microorganisms associated with the anode for carrying out secondary treatment of the water to produce electrons and protons,
means for transporting the electrons from the anode to the cathode,
means for transporting the protons from the anode to the cathode, and a catalyst for catalysing an electron acceptor reaction at the cathode.

8b. A microbial fuel cell for treating water, comprising
a chamber having a porous anode and a porous cathode through which water can flow,
a photocatalyst for initial treatment of the water,
a source of UV light for the photocatalyst,
microorganisms associated with the anode for carrying out secondary treatment of the water to produce electrons and protons,
means for transporting the electrons from the anode to the cathode,
means for transporting the protons from the anode to the cathode,
and a catalyst for catalysing an electron acceptor reaction at the cathode.

9b. A microbial fuel cell as described in clause 7b or 8b, wherein the cathode catalyst is present in the pores of the cathode.

10b. A microbial fuel cell as described in any of clauses 7b to 9b, wherein the cathode catalyst is an activated nickel catalyst.

11b. A microbial fuel cell as described in any of clauses 7b to 10b, including an inlet for introducing water into the chamber.

12b. A microbial fuel cell as described in any of clauses 7b to 11b, including an outlet through which treated water can leave the chamber.

13b. A microbial fuel cell as described in any of clauses 7b to 12b, including means for feeding water through the inlet, through the anode, through the cathode and out of the outlet.

14b. A microbial fuel cell as described in any of clauses 7b to 13b, additionally comprising an oxygen permeable, water impermeable, layer between the cathode and the outside of the cell, whereby oxygen from outside the cell can permeate into the cathode but water cannot escape out of the cell.

15b. A microbial fuel cell as described in clause 14b, wherein said layer comprises PTFE.

16b. A microbial fuel cell as described in any of clauses 7b to 15b, wherein the microorganisms are in the form of a biofilm attached to the anode.

17b. A microbial fuel cell, as described in any of clauses 7b to 16b, where the photocatalyst is integrated into the anode structure 18b. A method of treating water using a microbial fuel cell as described in any of clauses 7 to 17.

19b. An assembly substantially as hereinbefore described, with reference to and as illustrated in the accompanying drawings.

20b. A microbial fuel cell substantially as hereinbefore described, with reference to and as illustrated in the accompanying drawings.

It will be clear to a person skilled in the art that features described in relation to any of the embodiments described above can be applicable interchangeably between the different embodiments. The embodiments described above are examples to illustrate various features of the invention Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A photocatalyst comprising an electrically conductive titanium substrate with an exposed titanium dioxide surface having a macroporous architecture, wherein the titanium dioxide surface has a surface area of over 5 $m^2$ per gram of titanium dioxide, and wherein the titanium dioxide surface comprises a volume fraction of at least about 70% of the anatase phase.

2. The photocatalyst as claimed in claim 1, wherein the titanium dioxide has a microporous structure, at least at a surface thereof.

3. The photocatalyst as claimed in claim 1, wherein the macroporous architecture is formed from titanium wire configured as a sponge or mesh.

4. The photocatalyst as claimed in 3, wherein the sponge or mesh is open or reticulated.

5. The photocatalyst as claimed in claim 1, wherein the macroporous architecture is formed from a perforated titanium sheet material.

6. A structure comprising an electrically conductive titanium substrate having an exposed titanium dioxide surface with a macroporous architecture, wherein the titanium dioxide surface has a surface area of over 5 $m^2$ per gram of titanium dioxide, and wherein the titanium dioxide surface comprises greater than about 90 wt % of the anatase phase.

7. A method of manufacturing a photocatalyst comprising an electrically conductive titanium substrate having a macroporous architecture, comprising converting exposed surfaces of the titanium substrate into titanium dioxide by a plasma electrolytic oxidation process, wherein the titanium dioxide surfaces have a surface area of over 5$m^2$ per gram of titanium dioxide, and wherein the titanium dioxide surfaces comprise a volume fraction of the anatase phase greater than about 70%.

8. The method of manufacturing a photocatalyst as claimed in claim 7, wherein the titanium dioxide has a microporous structure, at least at a surface thereof.

9. The method of manufacturing a photocatalyst as claimed in claim 7, wherein the macroporous architecture is formed from titanium wire woven into a sponge or mesh.

10. The method of manufacturing a photocatalyst as claimed in 9, wherein the sponge or mesh is open or reticulated.

11. The method of manufacturing a photocatalyst as claimed in claim 7, wherein the macroporous architecture is formed from a perforated titanium sheet material.

12. A method of manufacturing a structure comprising an electrically conductive titanium substrate having a macroporous architecture, comprising converting exposed surfaces of the titanium substrate into titanium dioxide by a pulsed, bipolar plasma electrolytic oxidation process in an alkaline electrolyte, wherein the titanium dioxide surfaces have a surface area of over 5$m^2$ per gram of titanium dioxide, and wherein the titanium dioxide surface comprises greater than about 90 wt % of the anatase phase.

* * * * *